United States Patent [19]
Raith

[11] Patent Number: 6,081,514

[45] Date of Patent: Jun. 27, 2000

[54] METHOD AND APPARATUS FOR ENHANCED FUNCTIONS USING A RESERVED FIELD

[75] Inventor: Alex Krister Raith, Durham, N.C.

[73] Assignee: Telefonaktiebolaget LM Ericsson, Stockholm, Sweden

[21] Appl. No.: 09/009,723

[22] Filed: Jan. 21, 1998

Related U.S. Application Data

[62] Division of application No. 08/544,840, Oct. 18, 1995, Pat. No. 5,751,731.

[51] Int. Cl.[7] .................................................. H04B 7/212
[52] U.S. Cl. ............................................ 370/321; 370/322
[58] Field of Search .................................. 370/321, 322, 370/324, 326, 328, 329, 336, 337, 347, 442, 503, 509, 510, 512, 320, 341, 342, 345, 348, 349, 350, 441; 455/422, 434, 450, 515, 517, 95

[56] References Cited

U.S. PATENT DOCUMENTS

| | | | |
|---|---|---|---|
| 4,887,265 | 12/1989 | Felix | 370/333 |
| 4,916,691 | 4/1990 | Goodman | 370/389 |
| 5,119,375 | 6/1992 | Paneth et al. | 370/521 |

(List continued on next page.)

FOREIGN PATENT DOCUMENTS

| | | |
|---|---|---|
| 0 252 630 | 1/1988 | European Pat. Off. . |
| 0 652 680 | 5/1995 | European Pat. Off. . |

OTHER PUBLICATIONS

"Cellular System Dual–Mode Mobile Station—Base Station Compatibility Standard", *EIA/TIA Interim Standard, IS–54–B*, pertinent pages only, Apr. 1992.

K. Felix, "Packet Switching in Digital Cellular Systems", *Proc. 38th IEEE Vehicular Technology Conf*, pp. 414–418, Jun. 1988.

P. Decker et al., "A General Packet Radio Service Proposed for GSM", *GSM in a Future Competitive Environment*, Helsinki, Finland, pp. 1–20, Oct. 13, 1993.

P. Decker, "Packet Radio in GSM", *European Telecommunications Standards Institute (ETSI)*, T Doc SMG 4 58/93, pp. 1–13 (odd pages only), Feb. 12, 1993.

J. Hämäläinen et al., "Packet Data Over GSM Network", T Doc SMG 1 238/93, *ETSI*, pp. 1–8, Sep. 28, 1993.

*Primary Examiner*—Dang Ton
*Assistant Examiner*—Phirin Sam
*Attorney, Agent, or Firm*—Burns, Doane, Swecker & Mathis, L.L.P.

[57] ABSTRACT

A method and device are described for determining whether or not reserved bits of a field are assigned a function so that the mobile station may easily be adapted to perform enhanced functions. Such a determination enables first generation mobile stations to perform enhanced functions using bits which are initially reserved but may be assigned to service or function in later generations of the protocols. An indication of whether or not the reserved bits have been assigned a function may be sent on a broadcast channel by a usage information element. If the usage information element indicates that the reserved bits have not been assigned any service, such as power control, time alignment or short message services, the reserved bits may be used to enhance functions, such as equalization and synchronization. The method and device may further provide for improved decoding of the coded superframe phase/packet channel feedback (CSFP/PCF) field. Because the superframe phase (SFP) information is known when looking at the remaining bits from the start and end of the broadcast information, the number of possible codewords in the CSFP/PCF field may be reduced in the decoding process. Also, the length of a codeword to be decoded may be reduced based on a usage information element sent on the broadcast channel which indicates whether a reserved bit in the CSFP/PCF field is still reserved. More generally, the block code of any channel coded word, not necessarily packet data, may be effectively reduced based on knowledge of some information in the coded word. Decoding performance is improved by shortening the length of the codewords to be decoded because the shorter codewords are less susceptible to bit errors.

8 Claims, 6 Drawing Sheets

U.S. PATENT DOCUMENTS

| | | | |
|---|---|---|---|
| 5,175,867 | 12/1992 | Wejke et al. | 455/439 |
| 5,297,169 | 3/1994 | Backström et al. | |
| 5,299,235 | 3/1994 | Larsson et al. | |
| 5,353,332 | 10/1994 | Raith et al. | 455/455 |
| 5,517,681 | 5/1996 | Talarmo | 370/347 |
| 5,570,389 | 10/1996 | Rossi | 375/220 |
| 5,570,467 | 10/1996 | Sawyer | 455/515 |
| 5,598,417 | 1/1997 | Crisler et al. | 370/348 |
| 5,603,081 | 2/1997 | Raith et al. | 455/435 |
| 5,604,744 | 2/1997 | Anderson et al. | 370/347 |
| 5,606,548 | 2/1997 | Vayrynen et al. | 370/252 |
| 5,745,523 | 4/1998 | Dent et al. | 375/216 |
| 5,751,731 | 5/1998 | Raith | 714/776 |
| 5,770,927 | 6/1998 | Abe | 375/340 |
| 5,845,215 | 12/1998 | Henry et al. | 455/553 |

| $d_7$ | $d_6$ | $d_5$ | $d_4$ | $d_3$ | $d_2$ | $d_1$ | $d_0$ | $\bar{b}_3$ | $\bar{b}_2$ | $\bar{b}_1$ | $\bar{b}_0$ |
|---|---|---|---|---|---|---|---|---|---|---|---|
| $BP_{171}$ | $BP_{172}$ | $BP_{173}$ | $BP_{174}$ | $BP_{175}$ | $BP_{176}$ | $BP_{177}$ | $BP_{178}$ | $BP_{179}$ | $BP_{180}$ | $BP_{181}$ | $BP_{182}$ |

FIG. 6

| SYNC | PCF | DATA | CSFP/PCF | DATA | PCF | RSVD |
|---|---|---|---|---|---|---|
| 28 | 12 | 130 | 12 | 130 | 10 | 2 |

FIG. 7

| RSVD | PEQ | SFP |
|---|---|---|
| 1 | 2 | 5 |

FIG. 3
PRIOR ART

METHOD AND APPARATUS FOR ENHANCED FUNCTIONS USING A RESERVED FIELD

This application is a divisional of application Ser. No. 08/544.840, filed Oct. 18, 1995 now U.S. Pat. No. 5,751,731

BACKGROUND

Applicants' invention relates to electrical telecommunication, and more particularly to wireless communication systems, such as cellular and satellite radio systems, for various modes of operation (analog, digital, dual mode, etc.), and access techniques such as frequency division multiple access (FDMA), time division multiple access (IDMA), code division multiple access (CDMA), and hybrid FDMA/TDMA/CDMA. The invention is directed to enhancing timing, decoding and encoding aspects of electrical communication in wireless communication systems.

A description follows which is directed to environments in which this invention may be applied. This general description is intended to provide a general overview of known systems and the associated terminology so that a better understanding of the invention can be obtained.

In North America, digital communication and multiple access techniques such as TDMA are currently provided by a digital cellular radiotelephone system called the digital advanced mobile phone service (D-AMPS), some of the characteristics of which are specified in the interim standard TIA/EIA/IS-54-B, "Dual-Mode Mobile Station-Base Station Compatibility Standard", published by the Telecommunications Industry Association and Electronic Industries Association MIA/EIA). The TIA/EIA/IS-54-B standard is incorporated in this application by reference. Because of a large existing consumer base of equipment operating only in the analog domain with frequency-division multiple access (FDMA), TIA/EIA/IS-54-B is a dual-mode (analog and digital) standard, providing for analog compatibility together with digital communication capability. For example, the TIA/EIA/IS-54-B standard provides for both FDMA analog voice channels (AVC) and TDMA digital traffic channels (DTC). The AVCs and DTCs are implemented by frequency modulating radio carrier signals, which have frequencies near 800 megahertz (MHz) such that each radio channel has a spectral width of 30 kilohertz (KHz).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail below, digital control channels (DCCs) can also be provided for communicating control signals, and such a DCC is a logical channel formed by a succession of usually non-consecutive time slots on the radio carrier.

In only one of many possible embodiments of a TDMA system as described above, the TIA/EIA/IS-54-B standard provided that each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate. A full-rate DTC requires twice as many time slots in a given time period as a half-rate DTC, and in TIA/EIA/IS-54-B, each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

It can be seen that the TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving.

In addition to voice or traffic channels, cellular radio communication systems also provide paging/access, or control, channels for carrying call-setup messages between base stations and mobile stations. According to TIA/EIA/IS-54-B, for example, there are twenty-one dedicated analog control channels (ACCs), which have predetermined fixed frequencies for transmission and reception located near 800 MHz. Since these ACCs are always found at the same frequencies, they can be readily located and monitored by the mobile stations.

For example, when in an idle state (i.e., switched on but not making or receiving a call), a mobile station in a TIA/EIA/IS-54-B system tunes to and then regularly monitors the strongest control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel. When a control channel with good reception quality is found, the mobile station remains tuned to this channel until the quality deteriorates again. In this way, mobile stations stay "in touch" with the system.

While in the idle state, a mobile station must monitor the control channel for paging messages addressed to it. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MIN) of the called mobile station. Each idle mobile station receiving a paging message compares the received MIN with its own stored MIN. The mobile station with the matching stored MIN transmits a page response over the particular control channel to the base station, which forwards the page response to the MSC.

Upon receiving the page response, the MSC selects an AVC or a DTC available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected AVC or DTC.

The performance of the system having ACCs that is specified by TIA/EIA/IS-54-B has been improved in a system having digital control channels (DCCHs) that is specified in TIA/EIA/IS-136. Using such DCCHs, each TIA/EIA/IS-54-B radio channel can carry DTCs only, DCCHs only, or a mixture of both DTCs and DCCHs. Within the TIA/EIA/IS-136-B framework, each radio carrier frequency can have up to three full-rate DTCs/DCCHs, or six half-rate DTCs/DCCHs, or any combination in between, for example, one full-rate and four half-rate DTCs/DCCHs.

In general, however, the transmission rate of the DCCH need not coincide with the half-rate and full-rate specified in TIA/EIA/IS-54-B, and the length of the DCCH slots may not be uniform and may not coincide with the length of the DTC slots. The DCCH may be defined on an TIA/EIA/IS-54-B radio channel and may consist, for example, of every n-th slot in the stream of consecutive TDMA slots. In this case, the length of each DCCH slot may or may not be equal to 6.67 msec, which is the length of a DTC slot according to TIA/EIA/IS-54-B. Alternatively (and without limitation on other possible alternatives), these DCCH slots may be defined in other ways known to one skilled in the art.

In cellular telephone systems, an air link protocol is required in order to allow a mobile station to communicate with the base stations and MSC. The communications link protocol is used to initiate and to receive cellular telephone calls. The communications link protocol is commonly referred to within the communications industry as a Layer 2 protocol, and its functionality includes the delimiting, or framing, of Layer 3 messages. These Layer 3 messages may be sent between communicating Layer 3 peer entities residing within mobile stations and cellular switching systems. The physical layer (Layer 1) defines the parameters of the physical communications channel, e.g., radio frequency spacing, modulation characteristics, etc. Layer 2 defines the techniques necessary for the accurate transmission of information within the constraints of the physical channel, e.g., error correction and detection, etc. Layer 3 defines the procedures for reception and processing of information transmitted over the physical channel.

Figure 1:
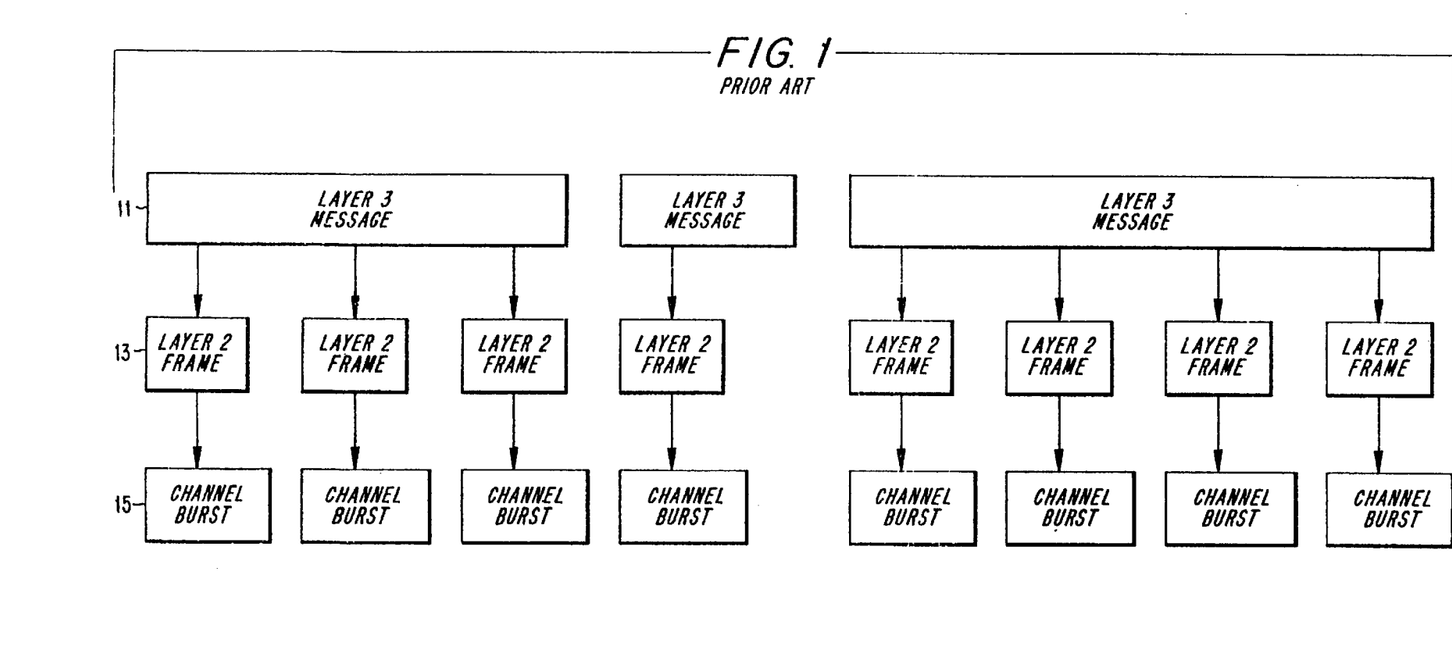
FIG. 1 schematically illustrates pluralities of Layer 3 messages, Layer 2 frames, and Layer 1 channel bursts, or time slots.
Figures 2A, 2B:
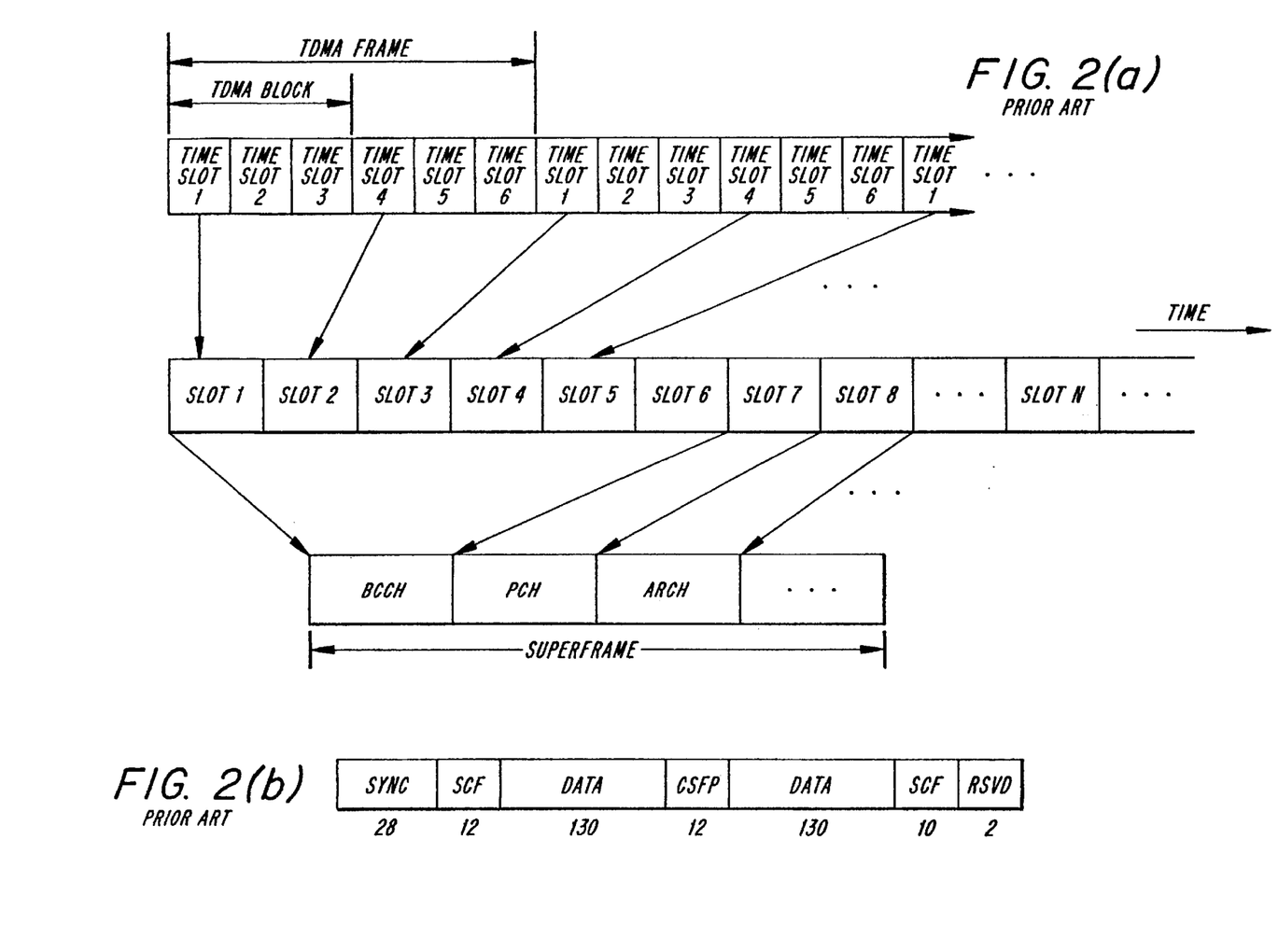
FIG. 2(a) shows a forward DCC configured as a succession of time slots included in the consecutive time slots sent on a carrier frequency.
FIG. 2(b) shows an example of an IS-136 DCCH field slot format.
Figure 2C:
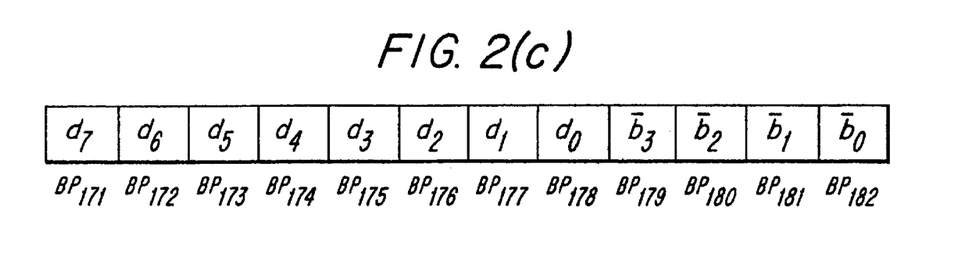
FIG. 2(c) shows an example of a CSFP bit allocation.

Communications between mobile stations and the cellular switching system (the base stations and the MSC) can be described in general with reference to FIGS. 1 and 2. FIG. 1 schematically illustrates pluralities of Layer 3 messages 11, Layer 2 frames 13, and Layer 1 channel bursts, or time slots, 15. In FIG. 1, each group of channel bursts corresponding to each Layer 3 message may constitute a logical channel, and as described above, the channel bursts for a given Layer 3 message would usually not be consecutive slots on an TIA/EIA/136 carrier. On the other hand, the channel bursts could be consecutive; as soon as one time slot ends, the next time slot could begin.

Each Layer 1 channel burst 15 contains a complete Layer 2 frame as well as other information such as, for example, error correction information and other overhead information used for Layer 1 operation. Each Layer 2 frame contains at least a portion of a Layer 3 message as well as overhead information used for Layer 2 operation. Although not indicated in FIG. 1, each Layer 3 message would include various information elements that can be considered the payload of the message, a header portion for identifying the respective message's type, and possibly padding.

Each Layer 1 burst and each Layer 2 frame is divided into a plurality of different fields. In particular, a limited-length DATA field in each Layer 2 frame contains the Layer 3 message 11. Since Layer 3 messages have variable lengths depending upon the amount of information contained in the Layer 3 message, a plurality of Layer 2 frames may be needed for transmission of a single Layer 3 message. As a result, a plurality of Layer 1 channel bursts may also be needed to transmit the entire Layer 3 message as there is a one-to-one correspondence between channel bursts and Layer 2 frames.

As noted above, when more than one channel burst is required to send a Layer 3 message, the several bursts are not usually consecutive bursts on the radio channel. Moreover, the several bursts are not even usually successive bursts devoted to the particular logical channel used for carrying the Layer 3 message. Since time is required to receive, process, and react to each received burst, the bursts required for transmission of a Layer 3 message are usually sent in a staggered format, as schematically illustrated in FIG. 2(a) and as described above in connection with the TIA/EIA/IS-136 standard.

FIG. 2(a) shows a general example of a forward (or downlink) DCCH configured as a succession of time slots 1, 2, ..., N, ... included in the consecutive time slots 1, 2, ... sent on a carrier frequency. These DCC slots may be defined on a radio channel such as that specified by TIA/EIA/IS-136, and may consist, as seen in FIG. 2(a) for example, of every n-th slot in a series of consecutive slots. Each DCC slot has a duration that may or may not be 6.67 msec, which is the length of a DTC slot according to the TIA/EIA/IS-136 standard.

As shown in FIG. 2(a), the DCCH slots may be organized into superframes (SF), and each superframe includes a number of logical channels that carry different kinds of information. One or more DCCH slots may be allocated to each logical channel in the superframe. The exemplary downlink superframe in FIG. 2(a) includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 2(a) may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

FIG. 2(b) illustrates a preferred information format for the slots of a forward DCCH. The information transferred in each slot comprises a plurality of fields, and FIG. 2(b) indicates the number of bits in each field above that field. The bits sent in the SYNC field are used in a conventional way to help ensure accurate reception of the CSFP and DATA fields. The SYNC field carries a predetermined bit pattern used by the base stations to find the start of the slot. The SCF field is used to control a random access channel (RACH), which is used by the mobile to request access to the system. The CSFP information conveys a coded superframe phase value that enables the mobile stations to find the start of each superframe. This is just one example for the information format in the slots of the forward DCCH. FIG. 2(c) illustrates the 12 bit allocation for the CSFP field which includes bits $d_7-d_0$ and check bits $b_3-b_0$.

For purposes of efficient sleep mode operation and fast cell selection, the BCCH may be divided into a number of sub-channels. A BCCH structure is known that allows the mobile station to read a minimum amount of information when it is switched on (when it locks onto a DCCH) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

Since each TDMA time slot has a certain fixed information carrying capacity, each burst typically carries only a portion of a Layer 3 message as noted above. In the uplink direction, multiple mobile stations attempt to communicate with the system on a contention basis, while multiple mobile stations listen for Layer 3 messages sent from the system in the downlink direction. In known systems, any given Layer 3 message must be carried using as many TDMA channel bursts as required to send the entire Layer 3 message.

Digital control and traffic channels are desirable for reasons, such as supporting longer sleep periods for the mobile units, which results in longer battery life. Digital traffic channels and digital control channels have expanded functionality for optimizing system capacity and supporting hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

Figure 3:
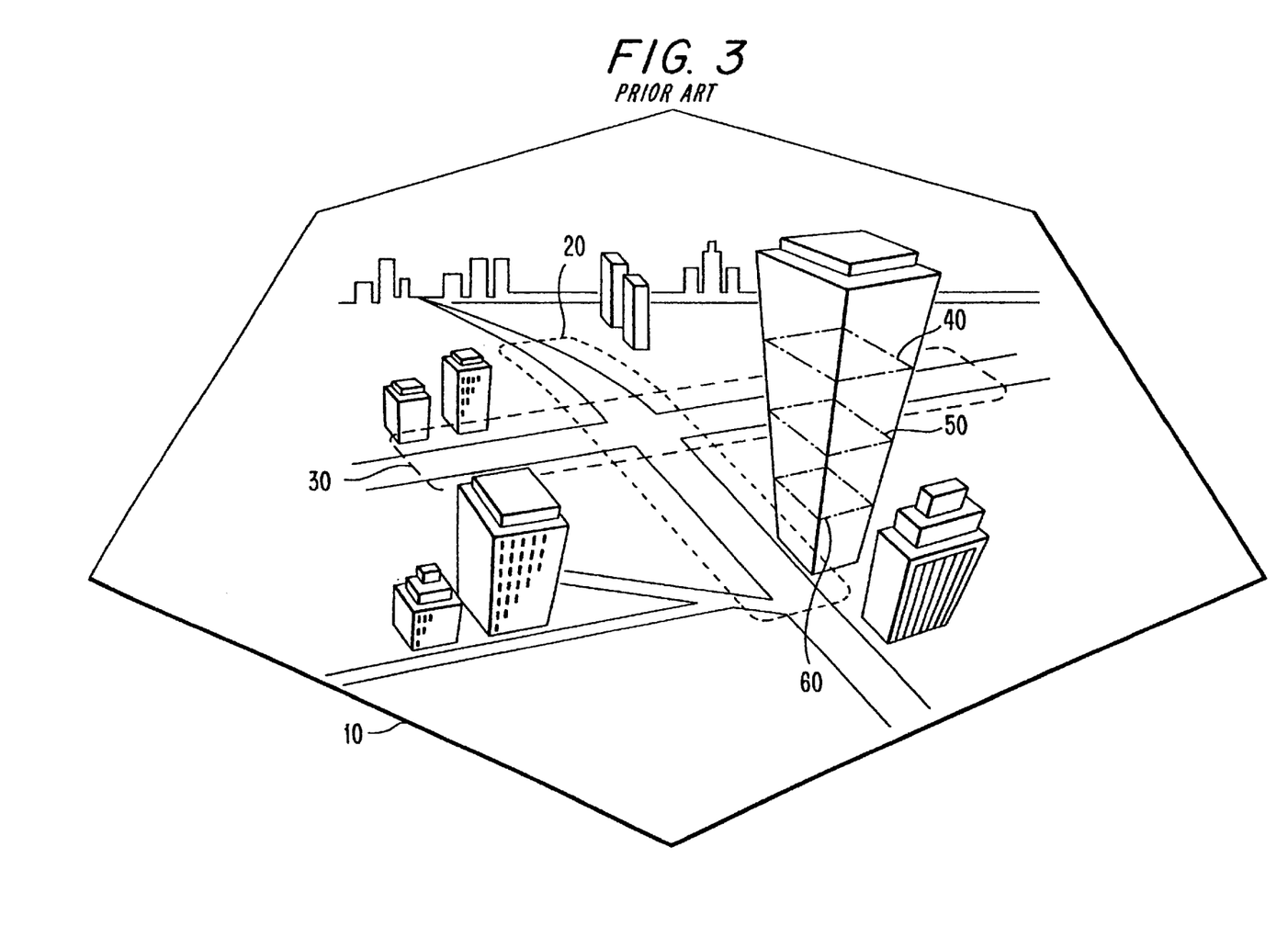
FIG. 3 illustrates an exemplary hierarchical, or multi-layered, cellular system.

FIG. 3 is an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

Figure 4:
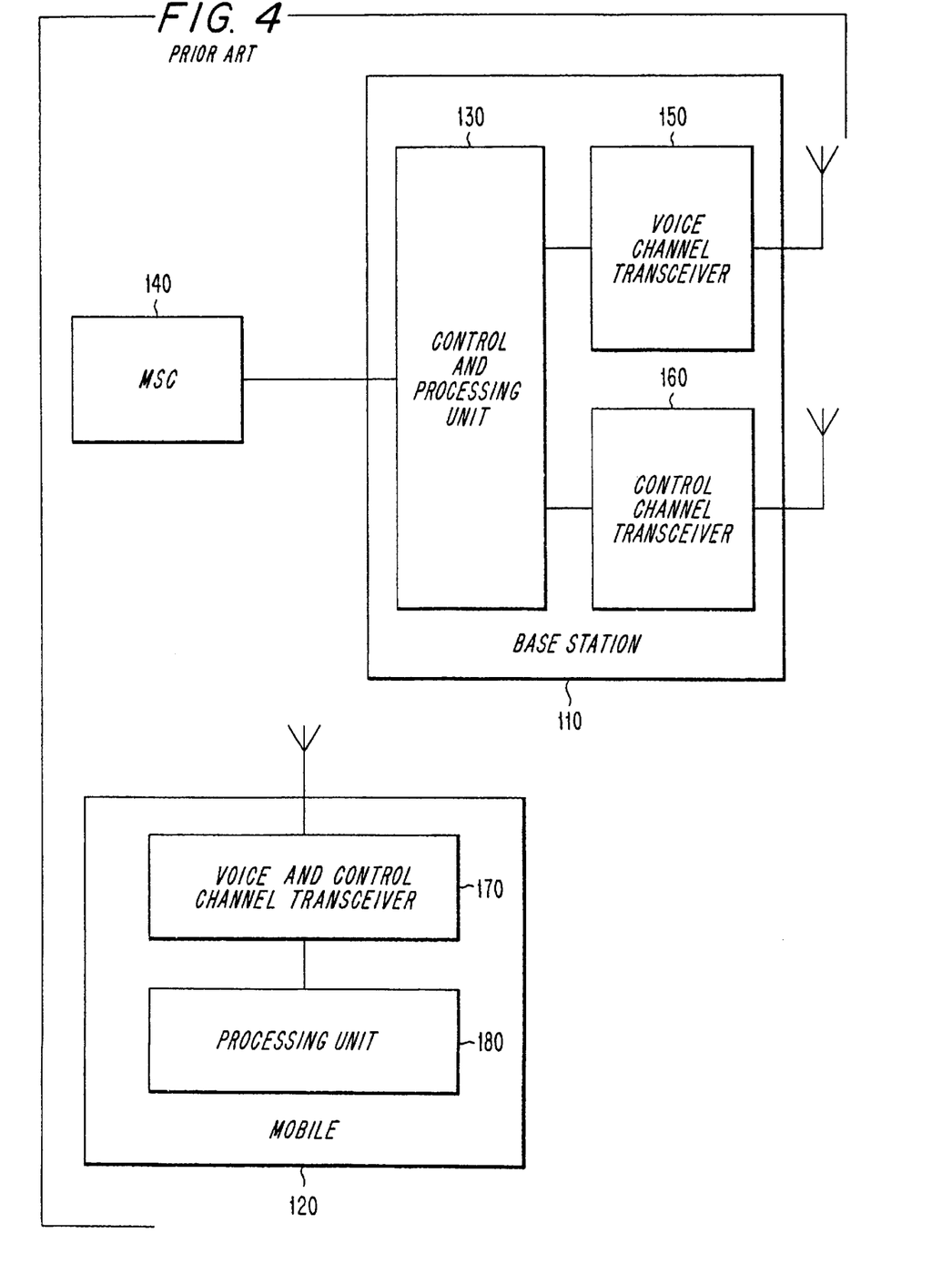
FIG. 4 is a block diagram of an exemplary cellular mobile radiotelephone system, including an exemplary base station and mobile station.

FIG. 4 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radio-telephone systems are known in the art, as described by U.S. Pat. No. 5,175,867 to Wejke et al., entitled "Neighbor-Assisted Handoff in a Cellular Communication System," which is incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCHs and DTCs that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

To increase the user's "talk time", i.e., the battery life of the mobile station, a digital forward control channel (base station to mobile station) may be provided that can carry the types of messages specified for current analog forward control channels (FOCCs), but in a format which allows an idle mobile station to read overhead messages when locking onto the FOCC and thereafter only when the information has changed; the mobile sleeps at all other times. In such a system, some types of messages are broadcast by the base stations more frequently than other types, and mobile stations need not read every message broadcast.

The systems specified by the TIA/EIA/IS-54-B and TIA/EIA/IS-136 standards are circuit-switched technology, which is a type of "connection-oriented" communication that establishes a physical call connection and maintains that connection for as long as the communicating end-systems have data to exchange. The direct connection of a circuit switch serves as an open pipeline, permitting the endsystems to use the circuit for whatever they deem appropriate. While circuit-switched data communication may be well suited to constant-bandwidth applications, it is relatively inefficient for low-bandwidth and "bursty" applications.

Packet-switched technology, which may be connection-oriented (e.g., X.25) or "connectionless" (e.g., the Internet Protocol, "IP"), does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers", stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Packet transmission along a route that takes into consideration path metrics, as opposed to a single circuit set up, offers application and communications flexibility. It is also how most standard local area networks (LANs) and wide area networks (WANs) have evolved in the corporate environment. Packet switching is appropriate for data communications because many of the applications and devices used, such as keyboard terminals, are interactive and transmit data in bursts. Instead of a channel being idle while a user inputs more data into the terminal or pauses to think about a problem, packet switching interleaves multiple transmissions from several terminals onto the channel.

Packet data provides more network robustness due to path independence and the routers' ability to select alternative paths in the event of network node failure. Packet switching, therefore, allows for more efficient use of the network lines. Packet technology offers the option of billing the end user based on amount of data transmitted instead of connection time. If the end user's application has been designed to make efficient use of the air link, then the number of packets transmitted will be minimal. If each individual user's traffic is held to a minimum, then the service provider has effectively increased network capacity.

Packet networks are usually designed and based on industry-wide data standards such as the open system interface (OSI) model or the TCP/IP protocol stack. These standards have been developed, whether formally or de facto, for many years, and the applications that use these protocols are readily available. The main objective of standards-based networks is to achieve interconnectivity with other networks. The Internet is today's most obvious example of such a standards-based network pursuit of this goal.

Packet networks, like the Internet or a corporate LAN, are integral parts of today's business and communications environments. As mobile computing becomes pervasive in these environments, wireless service providers such as those using TIA/EIA/IS-136 are best positioned to provide access to these networks. Nevertheless, the data services provided by or proposed for cellular systems are generally based on the circuit-switched mode of operation, using a dedicated radio channel for each active mobile user.

U.S. Pat. No. 4,887,265 and "Packet Switching in Digital Cellular Systems", Proc. 38th IEEE Vehicular Technology Conf., pp. 414–418 (June 1988) describe a cellular system providing shared packet data radio channels, each one capable of accommodating multiple data calls. A mobile station requesting packet data service is assigned to a particular packet data channel using essentially regular cellular signalling. The system may include packet access points (PAPS) for interfacing with packet data networks. Each packet data radio channel is connected to one particular PAP and is thus capable of multiplexing data calls associated with that PAP. Handovers are initiated by the system in a manner that is largely similar to the handover used in the same system for voice calls. A new type of handover is added for those situations when the capacity of a packet channel is insufficient.

These documents are data-call oriented and based on using system-initiated handover in a similar way as for regular voice calls. Applying these principles for providing general purpose packet data services in a TDMA cellular system would result in spectrum-efficiency and performance disadvantages.

U.S. Pat. No. 4,916,691 describes a new packet mode cellular radio system architecture and a new procedure for routing (voice and/or data) packets to a mobile station. Base stations, public switches via trunk interface units, and a cellular control unit are linked together via a WAN. The routing procedure is based on mobile-station-initiated handovers and on adding to the header of any packet transmitted from a mobile station (during a call) an identifier of the base station through which the packet passes. In case of an extended period of time between subsequent user information packets from a mobile station, the mobile station may transmit extra control packets for the purpose of conveying cell location information.

The cellular control unit is primarily involved at call establishment, when it assigns to the call a call control number. It then notifies the mobile station of the call control number and the trunk interface unit of the call control number and the identifier of the initial base station. During a call, packets are then routed directly between the trunk interface unit and the currently serving base station.

The system described in U.S. Pat. No. 4,916,691 is not directly related to the specific problems of providing packet data services in TDMA cellular systems.

"Packet Radio in GSM", European Telecommunications Standards Institute (ETSI) T Doc SMG 4 58/93 (Feb. 12, 1993) and "A General Packet Radio Service Proposed for GSM" presented during a seminar entitled "GSM in a Future Competitive Environment", Helsinki, Finland (Oct. 13, 1993) outline a possible packet access protocol for voice and data in GSM. These documents directly relate to TDMA cellular systems, i.e., GSM, and although they outline a possible organization of an optimized shared packet data channel, they do not deal with the aspects of in-tegrating packet data channels in a total system solution.

"Packet Data over GSM Network", T Doc SMG 1 238/93, ETSI (Sept. 28, 1993) describes a concept of providing packet data services in GSM based on first using regular GSM signalling and authentication to establish a virtual channel between a packet mobile station and an "agent" handling access to packet data services. With regular signalling modified for fast channel setup and release, regular traffic channels are then used for packet transfer. This document directly relates to TDMA cellular systems, but since the concept is based on using a "fast switching" version of existing GSM traffic channels, it has disadvantages in terms of spectrum efficiency and packet transfer delays (especially for short messages) compared to a concept based on optimized shared packet data channels.

Cellular Digital Packet Data (CDPD) System Specification, Release 1.0 (July 1993), describes a concept for providing packet data services that utilizes available radio channels on current Advanced Mobile Phone Service (AMPS) systems, i.e., the North American analog cellular system. CDPD is a comprehensive, open specification endorsed by a group of U.S. cellular operators. Items covered include external interfaces, air link interfaces, services, network architecture, network management, and administration.

The specified CDPD system is to a large extent based on an infrastructure that is independent of the existing AMPS infrastructure. Commonalities with AMPS systems are limited to utilization of the same type of radio frequency channels and the same base station sites (the base station used by CDPD may be new and CDPD specific) and employment of a signalling interface for coordinating channel assignments between the two systems.

Routing a packet to a mobile station is based on, first, routing the packet to a home network node (home Mobile Data Intermediate System, MD-IS) equipped with a home location register (HLR) based on the mobile station address; then, when necessary, routing the packet to a visited, serving MD-IS based on HLR information; and finally transferring the packet from the serving MD-IS via the current base station, based on the mobile station reporting its cell location to its serving MD-IS.

Although the CDPD System Specification is not directly related to the specific problems of providing packet data services in TDMA cellular systems that are addresssed by this application, the network aspects and concepts described in the CDPD System Specification can be used as a basis for the network aspects needed for an air link protocol in accordance with this invention. The CDPD System Specification is incorporated in this application by reference.

The CDPD network is designed to be an extension of existing data communications networks and the AMPS cellular network. Existing connectionless network protocols may be used to access the CDPD network. Since the network is always considered to be evolving, it uses an open network design that allows the addition of new network layer protocols when appropriate. The CDPD network services and protocols are limited to the Network Layer of the OSI model and below. Doing so allows upper-layer protocols and applications development without changing the underlying CDPD network.

From the mobile subscriber's perspective, the CDPD network is a wireless mobile extension of traditional networks, both data and voice. By using a CDPD service provider network's service, the subscriber is able seamlessly to access data applications, many of which may reside on traditional data networks. The CDPD system may be viewed as two interrelated service sets: CDPD network support services and CDPD network services.

CDPD network support services perform duties necessary to maintain and administer the CDPD network. These services are: accounting server; network management system; message transfer server; and authentication server. These services are defined to permit interoperability among service providers. As the CDPD network evolves technically beyond its original AMPS infrastructure, it is anticipated that the support services shall remain unchanged. The functions of network support services are necessary for any mobile network and are independent of radio frequency (RF) technology.

CDPD network services are data transfer services that allow subscribers to communicate with data applications. Additionally, one or both ends of the data communication may be mobile.

To summarize, there is a need for a system providing general purpose packet data services in D-AMPS cellular systems, based on providing shared packet-data channels optimized for packet data. This application is directed to systems and methods that provide the combined advantages of a connection-oriented network like that specified by the TIA/EIAIIS-136 standard and a connectionless, packet data network. Furthermore, the invention is directed to enhancing timing, decoding and encoding aspects of electrical communication in wireless communication systems.

SUMMARY

In accordance with an aspect of the invention, there is provided a method for determining whether or not reserved bits of a field are assigned a function so that the mobile station may easily be adapted to enhance other functions. Such a determination enables first generation mobile stations to enhance functions using bits which are initially reserved but may be assigned to services or functions in later generations of the protocols. An indication of whether or not the reserved bits have been assigned a function may be sent on a broadcast channel by a usage information element. If the usage information element indicates that the reserved bits have not been assigned any service, such as power control, time alignment or short message services, the reserved bits may be used to enhance functions such as equalization and synchronization.

In accordance with another aspect of the invention, the decoding of the coded superframe phase/packet channel feedback (CSFP/PCF) field is improved. Because the superframe phase (SFP) information is known when looking at the remaining bits, the number of possible codewords in the CSFP/PCF field may be reduced in the decoding process. Also, the length of a codeword to be decoded may be reduced based on a usage information element which indicates whether a reserved bit in the CSFP/PCF field is still reserved.

More generally, the block code of any channel coded word, not necessarily packet data, may be effectively reduced based on knowledge of some information in the coded word. Decoding performance is improved by shortening the length of the codewords to be decoded because the shorter codewords are less susceptible to bit errors.

BRIEF DESCRIPTION OF THE DRAWINGS

The features and advantages of Applicants' invention will be understood by reading this description in conjunction with the drawings in which.

DETAILED DESCRIPTION

Figure 5:
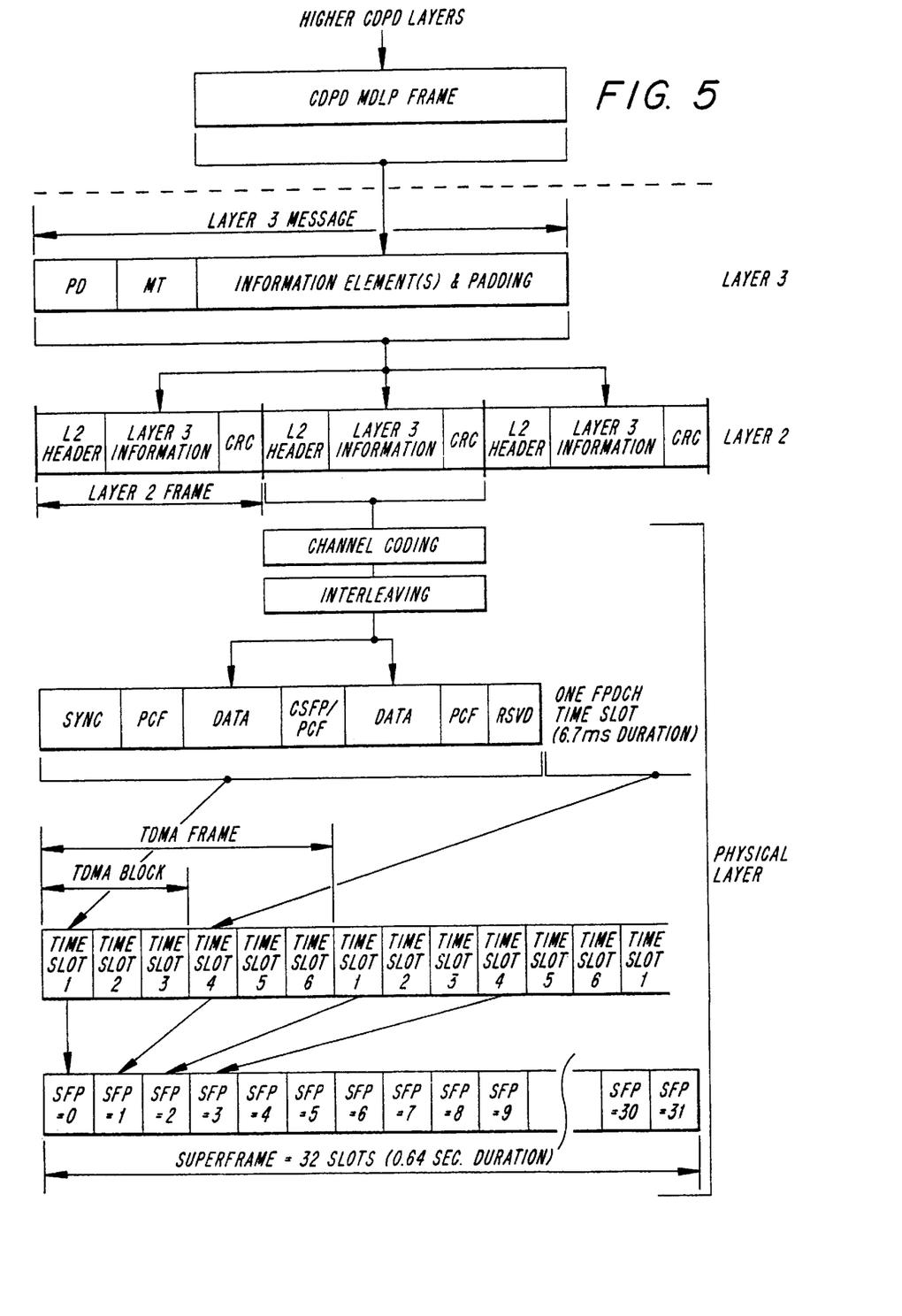
FIG. 5 illustrates one example of a possible message mapping sequence across layers.

To aid in understanding, one possible sequence for mapping higher layer messages into lower layer messages is illustrated in FIG. 5, which shows a dedicated PDCH example of how a Layer 3 message (which itself may be derived from higher layers, such as a frame in accordance with the CDPD mobile data link protocol) is mapped into several Layer 2 frames, an example of a Layer 2 frame mapping onto a time slot, and an example of time slot mapping onto a PDCH channel. (See also FIGS. 2(a), 2(b), 2(c).) The length of the forward packet data channel FPDCH time slots and reverse packet data channel RPDCH bursts are fixed, although there are three forms of RPDCH bursts which have different fixed lengths. The FPDCH slot and the full-rate PDCH are assumed to be on the physical layer in FIG. 5. This description assumes the TDMA frame structure is the same as the IS-136 DCCH and DTC, and the TIA/EIA/IS-136 standard is incorporated by reference in this application. In the interest of maximal throughput when a multi-rate channel is used (double-rate PDCH and triple-rate PDCH), a slightly different FPDCH slot format is specified as shown in FIGS. 5 and 6.

Figure 6:
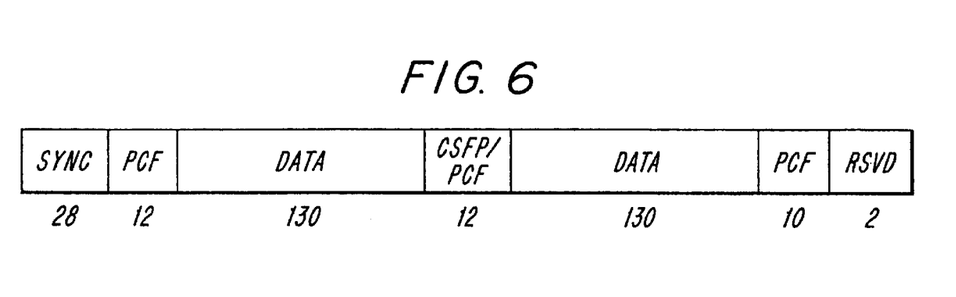
FIG. 6 illustrates an example of a slot format for BMI→MS messaging on PDCH.

FIG. 6 isolates the slot format which is used for BMI→MS (forward messaging) on a PDCH. One difference between the slot format illustrated in FIG. 6 and the IS-136 DCCH BMI→MS slot format is that a packet channel feedback PCF field is used instead of the shared channel feedback SCF field. Another difference is a CSFP/PCF field has replaced the CSFP field in the IS-136 DCCH format. The CSFP/PCF field is used to convey information regarding the superframe phase SFP so that mobile stations can find the start of a superframe.

In one aspect of the invention, an information element on the broadcast channel is used to inform the mobile station of whether or not reserved bits in a field have any functions assigned to them. By definition, no assumptions can be made on the values of the reserved bits in the field, and the values of the reserved bits are typically assigned to zero. Because initial versions of many specifications set reserved bits to zero and do not assign any functions to them, no use can be made of these bits by the mobile station even though future versions of the specifications may never assign functions to these bits. However, it is desirable to make use of such bits for enhanced functions, such as synchronization or equalization, while no functions are assigned to these bits. Accordingly, the invention provides for an information element on the broadcast channel for indicating whether or not the reserved bits are assigned a function.

The slot format shown in FIG. 6 includes a reserved bit field RSVD that, in accordance with IS-136, includes two reserved bits. The value of the RSVD bits are typically both set to a default 1 initially. Normally, the mobile station does not make any assumption as to the values of the bits.

In accordance with the invention, an information element sent in a broadcast channel message indicates whether the reserved bits may be used by the mobile station for a function such as demodulation or decoding, based on whether the reserved bits are used for services, such as power control, time alignment, or short messages. If the information element sent in the broadcast channel message indicates that the reserved bits have not been assigned any function, the mobile station can rely on the RSVD bits' having their default values and can use that information to enhance the performance of a demodulation function (synchronization or equalization), for example. If the information element indicates that the RSVD bits have been assigned to a service, the mobile cannot rely on those bits having their default values.

As shown in FIG. 6, the two RSVD bits can effectively be combined with the SYNC field in the following burst, yielding a 30-bit SYNC word. It will be appreciated, of course, that the mobile can apply this technique to any bits having known values.

Figure 7:
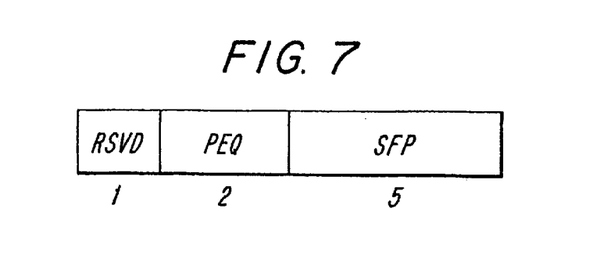
FIG. 7 illustrates an example of a CSFP/PCF field having eight information bits.

In accordance with another aspect of this invention, knowledge of some of the CSFP/PCF bits is used for enhancing the decoding of the remaining CSFP/PCF bits. As illustrated in FIG. 7, the CSFP/PCF field includes a twelve-bit codeword that represents eight information bits. In FIG. 7, the information bits comprise one reserved bit, two PEQ bits and five SFP bits, but it will be appreciated that these are just one particular example and this invention is not limited to this example.

When the mobile station is in the process of reading the bits, the mobile station has already synchronized to the superframe, and therefore the correct values of the five SFP bits are known to the mobile station. (The PEQ bits are used by the mobile station in a way similar to how the SCF in IS-136 is used when transmitting). As a result, the number of possible codewords representing the PEQ and RSVD bits is reduced from $2^8=256$ to $2^3=8$ in the process of decoding the remaining three bits. In effect, the (12,8) codeword has been reduced to a (7, 3) codeword that must be decoded. In addition, the protection of the CSFP/PCF field is enhanced because a (7, 3) codeword is less susceptible to bit errors than a (12, 8) codeword. In accordance with the invention, the decoding performance is thereby improved as compared with the standard decoding method which retrieves all eight information bits but then discards the five SFP bits.

An example of a decoding strategy for a (12, 8) codeword is described below. In this exemplary method, the received check bits may be inverted if they were inverted by the transmitter. Next, an exclusive OR function is performed on a "predicted" SFP value which is determined from the mobile's internal clock (i.e., the mobile station knows the "phase" of the time slot it is reading), and the sequence 1,1,1,1,1 and the result is encoded into a 12-bit codeword. An exclusive OR function is then performed on these two 12-bit vectors (i.e., the received CSFP/PCF field and the codeword produced from the "predicted" SFP value). The impact of the SFP on the bits at the position of the four check bits is thereby removed. The use of the exclusive OR permits discriminating among a DCCH, a DTC, and a PDCH as described in Applicant's U.S. patent application Ser. No. 08/544,835, filed Oct. 18, 1995, for "Discriminating Between Channels in Wireless Communication Systems," which is incorporated in this application by reference.

The five bits corresponding to the SFP bit positions are discarded next and the remaining seven bits are a (7, 3) codeword. This (7, 3) codeword, which is derived from the same (15, 11) code as the (12, 8) codeword, is finally decoded. It will be noted that the Hamming distance (3) is not changed since the (7, 3) codeword is a shortened version of the (12, 8) codeword. However, only one-bit errors may be corrected by this technique. Soft information may be used to further improve the decoding performance and shortening of the codeword.

As described above, the decoding performance may be further enhanced by analyzing a usage information element sent in the broadcast channel which indicates whether some of the CSFP/PCF bits are reserved (and thus have predetermined values or have been assigned particular functions. If the usage information element on the broadcast channel indicates that the bit or bits are reserved, the reserved bit or bits of the CSFP/PCF bits are known to have default values. Using such knowledge, the (7, 3) codeword may be shortened to a (6, 2) codeword, or alternatively, a (12, 8)

codeword may be shortened to a (11, 7) codeword. (The latter may be useful when the mobile does not know SFP value, such as before superframe synchronization). However, if the usage information element indicates the bit(s) are no longer reserved, no assumption can be made on their values and the codeword cannot be shortened. In general, the length of any channel coded word, not only codewords on a packet data channel, may be reduced based on knowledge of some information in the codeword.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for analyzing reserved bits in a field of a wireless communication system, comprising the steps of:
   (a) determining the state of a usage information element in a broadcast channel; and
   (b) performing functions using the reserved bits in response to the state of said usage information element determined at said step (a).

2. A method according to claim 1, wherein said functions are performed by a mobile station with the reserved bits when said usage information element indicates that the reserve bits are not used for performing any other functions.

3. A method according to claim 1, wherein the functions include synchronization and equalization functions.

4. A device for analyzing reserved bits in a field of a wireless communication system, comprising the steps of:
   a detector for determining the state of usage information element in a broadcast channel; and
   a processor performing functions using the reserved bits in response to the state of said usage information element determined by said detector.

5. A device according to claim 4, wherein said functions are performed by a mobile station with the reserved bits when said usage information element indicates that the reserved bits are not used for performing any other functions.

6. A device according to claim 4, wherein the functions include synchronization and equalization functions.

7. A method for synchronizing to a received time slot comprising the steps of:
   receiving a first time slot and a second time slot;
   using a reserved field in said first time slot together with a synchronization field in said second time slot to synchronize to said second time slot.

8. The method of claim 7, further comprising the step of:
   broadcasting an indication regarding whether said reserved field can be used for synchronization.

* * * * *